United States Patent [19]

Wheeler

[11] 4,444,841
[45] Apr. 24, 1984

[54] EXTRUDED AES FILM

[75] Inventor: Robert D. Wheeler, Fairfield, Conn.

[73] Assignee: Uniroyal, Inc., New York, N.Y.

[21] Appl. No.: 406,581

[22] Filed: Aug. 9, 1982

[51] Int. Cl.³ .............................................. B32B 15/08
[52] U.S. Cl. .................................... 428/339; 428/462; 428/463; 428/496; 428/507; 428/521
[58] Field of Search ............... 428/520, 332, 462, 463, 428/496, 532

[56] References Cited

U.S. PATENT DOCUMENTS 3,489,821  1/1970  Witt et al. ................................ 525/75
4,202,948  5/1980  Peascoe .................................. 525/70

OTHER PUBLICATIONS

"Modern Plastics Encyclopedia" vol. 52, Edition 75-76.

Primary Examiner—George F. Lesmes
Assistant Examiner—E. Rollins Buffalow
Attorney, Agent, or Firm—James J. Long; Bert J. Lewen

[57] ABSTRACT

An extruded AES film in which the AES contains 15-30% rubber having a thickness of 1 to 10 mils, and a laminate of such film to another material, such as a metallic or cellulosic base.

3 Claims, No Drawings

EXTRUDED AES FILM

Copending application Ser. No. 06/406,597 filed Aug. 9, 1982 of Charles F. Paddock discloses a laminate having at least two layers, one of which comprises an AES graft copolymer composition, the other being a rigid foamed plastic.

Copending application Ser. No. 06/406,599 filed Aug. 9, 1982 of John M. Wefer discloses coextrusion of AES onto another thermoplastic resin.

Copending application Ser. No. 06/406,598 filed Aug. 9, 1982 of John M. Wefer discloses calendered AES film containing 25-40% rubber, usually pigmented.

The present invention relates to extruded AES film and the use of said film as a surface layer in laminates.

The AES graft copolymer composition employed in the invention is described in U.S. Pat. No. 4,202,948, Peascoe, May 13, 1980 and is ordinarily based on a graft copolymer of resin-forming monomeric material (especially such monomers as vinyl aromatics, alkenoic nitriles, esters, or acids, or mixtures thereof, e.g., a mixture of styrene and acrylonitrile) on an olefin copolymer rubber spine, whether a saturated ethylene-propylene rubber (EPM) or an unsaturated terpolymer (EPDM) containing a suitable diene, especially a non-conjugated diene, as in rubbery terpolymers of ethylene, propylene, and dicyclopentadiene, ethylidene norbornene, hexadiene, or the like. In the preparation of such a graft copolymer, much of the resin-forming monomers become chemically grafted to the rubbery spine, but a certain amount of ungrafted resin is also formed (i.e., grafting efficiency is not 100%). In a preferred practice, additional separately prepared resin is blended with the product of the graft polymerization step. Typically, separately prepared styrene-acrylonitrile resin (SAN) is blended with the product of graft polymerization of styrene and acrylonitrile on EPDM. However, it is also possible to make all of the resinous portion in situ during the graft polymerization. In either case the entire final SAN-EPDM product may be referred to as AES.

AES compositions are useful as they combine high impact strength, rigidity, and weatherability. Articles of all sorts may be made by injection molding, profile extrusion or sheet extrusion. These major process operations may also be followed by other operations such as trimming, cutting, painting, thermoforming, fastening, welding, etc., to produce the finished article.

In the case of typical AES sheet extrusion which is relatively heavy gauged, AES is extruded as an integral material or coextruded over one or both sides of a less weatherable material such as ABS (acrylonitrile-butadiene-styrene). In the latter case the AES layer or layers provide a protective screen to prevent or delay degradation of the substrate from the harmful effects of outdoor exposure, expecially sunlight. This protective layer is most effective in screening out sunlight when it is pigmented. The level of pigment and thickness of the AES layer that will provide adequate protection of the substrate must be determined on a case-by-case basis and will depend upon the type of pigment used, type of substrate, expected severity of sunlight exposure and desired lifetime of the product. The degree to which the AES protective layer will be "drawn down" (made thinner) during thermoforming of the sheet into a particular article must also be taken into account. In general terms, however, the higher the pigment loading in the cap layer or layers, the more effective will be the screening effect.

There are practical limits, however, for at very high loadings of pigment the impact strength of the AES layer will be significantly reduced. It is known that a reduction in impact strength on the surface layer of a sheet can reduce the impact strength of the entire sheet.

In one aspect, the invention is directed to an extruded AES film in which the AES contains 15-30% rubber having a thickness of from 1 to 10 mils, especially such an extruded AES film containing 2 to 20 parts of pigment per 100 parts of AES.

The invention further relates to a laminate having on at least one surface a layer of extruded AES film in which the AES contains 15-30% rubber, said extruded film having a thickness of from 1 to 10 mils. The other layer of the laminate may comprise any of a variety of materials such as, for example:

1. Another thermoplastic resin (single layered or multi-layered).
2. A non-plastic material, such as a metal (e.g., iron, steel, copper, etc.) or a cellulosic material (e.g., wood, particle board, fiber board, cloth, etc.)

It has surprisingly been found that the limitations of prior practices can be overcome in a particularly advantageous manner by an extruded AES film having a rubber content with in the range of from 15-30% (typically EPM or EPDM) based on the total weight of rubber plus resin (including both resin formed in situ and any added separately prepared styrene-acrylonitrile resin or the like). Especially preferred is a rubber content of from 18 to 28%.

In Modern Plastics Encyclopedia, 1969-70 edition, sheet is defined (page 52C) as a flat section of a thermoplastic resin with the length considerably greater than the width and 10 mils or greater in thickness. Film is defined (page 43) as an optional term for sheet having a nominal thickness not greater than 0.010 inches. The present invention is concerned with film.

For purposes of the invention AES, one to ten mils thick, can be extruded using flat film dies or blown flim equipment. The preferred technique is the blown film method which involves extrusion of the AES through a circular die and expansion of a resulting "bubble" by air admitted through a central mandrel. The bubble is subsequently collapsed by a plate assembly and a nip roll seals in a uniform volume of air in the bubble. An air ring is utilized for cooling and freezing off the perimeter of the bubble after it exits from the die and expands to its finished diameter. The blow up ratio (final bubble diameter divided by the die orifice diameter) is ordinarily between 1.5 to 1 and 3 to 1. The use of a collapser assembly designed for rigid film is recommended to prevent crinkling and folding of the film. Film gage uniformity can be improved by using a rotating die. The finished AES sheet can be rolled as a tube or slit and rolled as flat sheet (film).

The two major advantages of the blown film process are the biaxial orientation of the film and the lack of taper at the film edge.

The extruded film of the invention is normally laminated onto one or both sides of a less weatherable material. The extruded pigmented laminated film serves as a screen to protect the less weatherable substrate from the harmful effects of sunlight, moisture, etc.

The quantity of pigment present in the extruded film of the invention is not critical but normally falls within the range of from 2 parts or less to 20 parts or more, per 100 parts by weight of the AES. Any suitable conventional pigment may be used. An important consideration in choosing pigments for outdoor use is lightfasteness. Inorganic pigments tend to be more lightfast than organic pigments although many organic pigments are sufficiently lightfast for outdoor use. Examples of suitable pigments are titanium dioxide pigments such as Unitane OR-450 (trademark), iron oxide pigments such as Pure Red Iron Oxide R1299 (trademark), carbon black such as Black Pearls 900 (trademark) and Irgazin Red BPT (trademark). Ordinarily up to 20 parts by weight of pigment is used, per 100 parts by weight of AES.

The AES employed in the invention is preferably prepared by blending two separate components, namely:

(A) a graft copolymer of styrene and acrylonitrile on EPDM rubber; and (B) separately prepared styrene-acrylonitrile resin.

Examples of graft component (A) and the separately prepared resin component (B) are described in more detail in U.S. Pat. No. 4,202,948, Peascoe, May 13, 1980. The preferred graft copolymer (A) is prepared by graft copolymerizing (a) styrene and acrylonitrile in weight ratio of 80/20 to 65/35 on (b) a rubber terpolymer of ethylene, propylene and dicyclopentadiene in which the weight ratio of ethylene to propylene is within the range of from 80/20 to 20/80. The Mooney viscosity of the terpolymer rubber (b) is preferably from 30 to 90 ML-4 at 257° F. and the iodine number of the rubber (b) preferably is from 10 to 50. The amount of (a) acrylonitrile/styrene is about 50% based on the weight of (a) plus (b).

The preferred separately prepared resin (B) is a copolymer of styrene and acrylonitrile in weight ratio of 80/20 to 65/35 having an intrinsic viscosity in dimethylformamide at 30° C. of at least 0.4. The amount of resin (B) in the AES is sufficient to provide an over-all ratio of resin to rubber in the range of from 85/15 to 70/30.

In a particularly valuable form of the invention, an antioxidant is present during the graft copolymerization stage.

Component A (the graft copolymer) and component B (the separately prepared resin), are sheared or masticated together at elevated (fluxing) temperature, for example in a twin screw type of extruder-blender, or batch mixer such as a Banbury mixer. Other ingredients such as UV stabilizers and pigments may also be added at this stage.

In the case of an AES film on a non-plastic substrate (metal, wood, etc.) the finished article is usually a flat sheet or shallow drawn part where there is little or no thinning of the film. In addition, because of the strength of the substrate, appearance retention rather than impact strength becomes the dominant requirement of the film. Thus, typically thinner and lower rubber content (harder surface) films can be used when the substrate is non-plastic. In this case, thin film extrusion (particularly blown film extrusion) provides a higher quality and less costly film than calendering.

A particularly valuable form of the invention comprises an AES capped metal sheet for use as side wall panels in the commercial building and construction industry. Such AES/metal construction can be used in place of a variety of siding materials including painted steel or aluminum, acrylic film laminated steel, aluminum and aluminum/zinc alloy coated steel and stainless steel.

Another valuable embodiment of the invention comprises an AES film laminated to a cellulosic base, particularly a wood base.

Although a suitable thin AES film for use in the invention may be made by various extrusion processes, it is preferred that the film be prepared by the blown film process (in which the film is extruded as a tube which is blown, flattened and slit—see Modern Plastics Encyclopedia 1981-1982, page 290). The thickness of film suitable for use in the invention is from 1 to 10 mils, preferably 2 to 5 mils.

In making the laminate, the extruded AES film may be applied to the substrate in any suitable conventional manner, continuously if desired. If the AES and the substrate are not inherently mutually adhesive, a suitable material may be applied to the AES film or the substrate prior to simultaneously with the laminating step. Elevated temperaure and pressure may be used to assist the lamination.

The following example will serve to illustrate the practice of the invention in more detail.

EXAMPLE

The AES employed in this exmple is that described in U.S. Pat. No. 4,202,948 referred to above.

Film having a thickness of about 4 mils is produced by the extruded blown film process.

Steel sheet having a thickness of 10 mils treated with a phosphite rust inhibitor is coated with a conventional adhesive composition such as a heat-sensitive polyurethane; the adhesive coating is allowed to dry.

The AES film is pressed to the adhesive-coated metal at a temperature of 425° F. for two minutes.

Adhesion is tested initially on a flat stock and after one hour in boiling water on a dimpled panel. The dimple is formed by pressing a one inch steel sphere into the back of the panel. To test the adhesion the dimple is scored with a sharp knife and a pressure-sensitive adhesive tape is applied and removed. The AES film does not pull off, indicating that the adhesion is entirely satisfactory.

What is claimed is:

1. A laminate comprising a cellulosic or metal base having on at least one surface a layer of blown extruded AES film, containing 18-28% rubber, having a thickness of from 1 to 10 mils.

2. A laminate as in claim 1 in which the extruded film contains 2 to 20 parts of pigment per 100 parts of AES.

3. A laminate as in claim 2 in which the resin forming materials in the extruded film are styrene and acrylonitrile.

* * * * *